United States Patent
Abraham et al.

(10) Patent No.: US 9,440,558 B2
(45) Date of Patent: Sep. 13, 2016

(54) HINGE MECHANISM FOR A VEHICLE SEAT AND METHOD FOR OPERATING A VEHICLE SEAT

(71) Applicant: Johnson Controls Technology Company, Holland, MI (US)

(72) Inventors: James Abraham, Köln (DE); Robin Advena, Köln (DE)

(73) Assignee: Johnson Controls Technology Company, Holland, MI (US)

( * ) Notice: Subject to any disclaimer, the term of this patent is extended or adjusted under 35 U.S.C. 154(b) by 89 days.

(21) Appl. No.: 14/407,420

(22) PCT Filed: Jun. 4, 2013

(86) PCT No.: PCT/EP2013/061483
§ 371 (c)(1),
(2) Date: Dec. 11, 2014

(87) PCT Pub. No.: WO2013/186086
PCT Pub. Date: Dec. 19, 2013

(65) Prior Publication Data
US 2015/0123443 A1    May 7, 2015

(30) Foreign Application Priority Data

Jun. 13, 2012 (DE) .......... 10 2012 209 933
Sep. 20, 2012 (DE) .......... 10 2012 216 901

(51) Int. Cl.
*B60N 2/20* (2006.01)
*B60N 2/30* (2006.01)
*B60N 2/10* (2006.01)

(52) U.S. Cl.
CPC ............... *B60N 2/10* (2013.01); *B60N 2/206* (2013.01); *B60N 2/305* (2013.01); *B60N 2/3011* (2013.01)

(58) Field of Classification Search
CPC ............ B60N 2/14; B60N 2/20; B60N 2/305
USPC ............................. 297/378.12, 336
See application file for complete search history.

(56) References Cited

U.S. PATENT DOCUMENTS 4,484,779 A * 11/1984 Suzuki ............... B60N 2/366
297/326
5,393,116 A * 2/1995 Bolsworth ......... B60N 2/01583
296/65.03

(Continued)

FOREIGN PATENT DOCUMENTS

CN  1215673 A  5/1999
CN  1412043 A  4/2003

(Continued)

OTHER PUBLICATIONS

Office Action dated Dec. 2, 2015, received in corresponding Chinese application No. 201380030784.6, 7 pages.

(Continued)

*Primary Examiner* — Timothy J Brindley
(74) *Attorney, Agent, or Firm* — Foley & Lardner LLP (57) ABSTRACT

A hinge mechanism for a vehicle seat includes an actuating lever, a disengaging lever, a main rotary axis, a deflection lever and a deflection rod. It also includes a separate first operating element for folding a backrest over in the direction of a seat part in the case of a fixed seat part, and a separate second operating element for folding over the backrest in the case of a simultaneous or subsequent pivot movement of the seat part. A method is provided for operation of a vehicle seat with a hinge mechanism.

9 Claims, 5 Drawing Sheets

(56) References Cited

U.S. PATENT DOCUMENTS

| | | | | |
|---|---|---|---|---|
| 5,522,643 | A * | 6/1996 | Matsuura | B60N 2/2354 297/367 R |
| 6,065,804 | A * | 5/2000 | Tanaka | B60N 2/01583 296/65.03 |
| 6,113,187 | A | 9/2000 | Sugiyama et al. | |
| 6,290,297 | B1 * | 9/2001 | Yu | B60N 2/01583 297/378.12 |
| 6,345,867 | B1 * | 2/2002 | Hellrung | B60N 2/01583 296/65.03 |
| 6,827,394 | B2 * | 12/2004 | Watanabe | B60N 2/206 296/63 |
| 7,000,990 | B1 * | 2/2006 | Liu | B60N 2/206 296/65.09 |
| 7,198,316 | B2 * | 4/2007 | Lutzka | B60N 2/01583 296/65.03 |
| 7,802,490 | B2 * | 9/2010 | Ingraham | B60N 2/3011 297/1 |
| 7,828,382 | B2 * | 11/2010 | Ozeki | B60N 2/12 297/341 |
| 7,887,134 | B2 * | 2/2011 | Shao | B60N 2/20 297/378.1 |
| 8,360,528 | B2 * | 1/2013 | Shinohara | B60N 2/01583 296/65.09 |
| 8,424,969 | B2 * | 4/2013 | Kammerer | B60N 2/12 297/325 |
| 8,496,294 | B2 * | 7/2013 | Holdampf | B60N 2/2356 296/65.09 |
| 8,534,750 | B2 * | 9/2013 | Sayama | B60N 2/01583 296/65.09 |
| 2003/0056329 | A1 | 3/2003 | Coman et al. | |
| 2004/0075323 | A1 * | 4/2004 | Blair | B60N 2/06 297/331 |
| 2006/0273645 | A1 * | 12/2006 | Ferrari | B60N 2/01583 297/336 |
| 2007/0182231 | A1 * | 8/2007 | Lutzka | B60N 2/305 297/378.12 |
| 2011/0049953 | A1 | 3/2011 | Champ | |
| 2011/0068612 | A1 | 3/2011 | Thiel | |
| 2011/0210591 | A1 * | 9/2011 | Park | B60N 2/01583 297/325 |
| 2013/0043708 | A1 * | 2/2013 | Gupte | B60N 2/20 297/378.12 |

FOREIGN PATENT DOCUMENTS

| | | |
|---|---|---|
| DE | 10 2006 0 17 7 A1 | 11/2006 |
| FR | 2781435 B1 | 1/2000 |
| GB | 2 231 617 B | 11/1990 |
| GB | 2 408 677 A | 6/2005 |
| JP | H31-004737 A | 1/1991 |

OTHER PUBLICATIONS

International Search Report in PCT/EP2013/061483 dated Aug. 13, 2013 and English translation, 5 pages.

Office Action in German priority Application No. 10 2012 216 901.6 dated Feb. 6, 2013, 5 pages.

English translation of Office Action dated Dec. 2, 2015, received in corresponding Chinese application No. 201380030784.6, 7 pages.

* cited by examiner

HINGE MECHANISM FOR A VEHICLE SEAT AND METHOD FOR OPERATING A VEHICLE SEAT

CROSS REFERENCE TO RELATED APPLICATIONS

The present application is a U.S. National Stage of International Application No. PCT/EP2013/061483filed on Jun. 4, 2013, which claims the benefit of German Patent Application Nos. 10 2012 209 933.6 filed on Jun. 13, 2012and 10 2012 216 901.6 filed on Sep. 20, 2012, the entire disclosures of all of which are incorporated herein by reference.

The invention relates to a hinge mechanism for a vehicle seat. The invention further relates to a method for operating a vehicle seat having such a hinge mechanism.

In the prior art, backrests of vehicle seats in a fixed seat member can be folded over so that they rest flat on the seat member of the vehicle seat. This functionality is also referred to as a fold flat operation.

Alternatively, a backrest of a vehicle seat can be folded in the direction of a seat member, whilst the seat member can be pivoted with the backrest which is coupled thereto. This functionality is also referred to as a fold and tumble operation.

A vehicle seat release arrangement is known from DE 10 2006 017 797 A1. The vehicle seat comprises a backrest, a seat face and a seat frame. The seat frame retains the seat face and further has a backrest rotation arrangement which is constructed in such a manner that the backrest can move between an upright position and a folded position in which the backrest is folded downward onto the seat face. Using a hinge mechanism, the rear portion of the seat frame is lifted upward and forward in a rotating manner in order to move the seat frame to a tilted position. A first locking mechanism is constructed to lock the backrest in the upright position. A second locking mechanism is constructed to lock the seat face to the vehicle floor. In addition, the release arrangement is constructed to release the first and the second locking mechanism and has a release member and a roller arrangement in order to provide a lever action when the release arrangement is actuated.

Furthermore, FR 2 781 435 describes a hinge mechanism for a vehicle seat.

An object of the present invention is to provide a hinge mechanism for a vehicle seat, which hinge mechanism is improved compared with the prior art, and an improved method for operating a vehicle seat using such a hinge mechanism.

With regard to the hinge mechanism for a vehicle seat, the object is achieved by the features set out in claim 1.

With regard to the method for operating a vehicle seat with such a hinge mechanism, the object is achieved by the features set out in claim 10.

The dependent claims relate to advantageous developments of the invention.

The hinge mechanism for a vehicle seat comprises according to the invention an actuation lever, a release lever and a redirection lever and a separate first operating element for a folding-over operation of a backrest in the direction toward a seat member with a fixed seat member and a separate second operating element for folding over the backrest with a simultaneous or subsequent pivot movement of the seat member. The hinge mechanism further comprises a release lever, a main rotation axle and a redirection rod which is articulated to the redirection lever at the end side with, in the event of actuation of the first operating element, the redirection lever being able to be coupled to the first operating element for entrainment in such a manner that the redirecting rod opens the hinge mechanism or, when the second operating element is actuated, the element opens the hinge mechanism directly, for example, in a lever-free manner by means of a Bowden cable, and the actuation lever can be coupled to the release lever for entrainment in such a manner that the vehicle seat can be unlocked at the floor side.

This comparatively small number of components allows a simple combined hinge mechanism having both a separate folding function (=fold flat operation) and a separate fold and pivot function (=fold and tumble operation) for the vehicle seat. As a result of the comparatively small number of additional components, a conventional hinge mechanism can further be expanded in a simple manner to a hinge mechanism according to the invention.

Furthermore, as a result of the separation of the mentioned fold flat operation and the fold and tumble operation, occurrences of incorrect operation are prevented.

Advantageously, the actuation lever is constructed in an L-shaped manner and comprises a first lever arm and a second lever arm which are arranged at an angle of 90 degrees relative to each other. The actuation lever can be pivoted in the central region thereof about a pivot axle and is fixed on the backrest of the vehicle seat. The construction with two lever arms and the pivotable arrangement on the backrest structure enables simple adjustment of the actuation lever and enables in a particularly advantageous manner a movement of the first lever arm along different actuation paths.

In a preferred manner, a protruding sliding cam is arranged at a free end of the first lever arm. This enables the sliding cam to be moved along the actuation paths with minimized friction.

The actuation lever is pretensioned by means of a spring which is arranged in the region of the pivot axle. The actuation lever is thereby held in abutment with the respective actuation path.

The sliding cam of the first lever arm of the actuation lever can be moved along a first actuation path or a second actuation path. In this instance, the first actuation path is constructed as an actuation contour, in particular a guiding contour at boundary faces or planes of a base plate, and a movement of the first lever arm of the actuation lever along the first actuation path brings about the folding-over operation of the backrest of the vehicle seat with the seat member being fixed.

The second actuation path is constructed as a sliding contour, in particular a guiding contour at boundary faces or planes of a base plate, and a movement of the first lever arm of the actuation lever along the second actuation path brings about the folding-over operation of the backrest with a simultaneous or subsequent pivot movement of the seat member. The fold flat operation and the fold and tumble operation are thereby functionally separated by the different actuation paths so that occurrences of incorrect operation are prevented in a reliable manner.

Advantageously, the first actuation path can be blocked as a function of the position of the redirection lever, in particular the actuation portion thereof, so that the second actuation path can be used. A cancellation of the blocking action by the corresponding operation opens the first actuation path.

In the method for operating a vehicle seat having a hinge mechanism, with a first operating element, a folding-over operation of a backrest of the vehicle seat is actuated with a fixed seat member so that the backrest rests flat on the seat member of the vehicle seat or, with a second operating element, a folding-over operation of the backrest with a simultaneous or subsequent pivot movement of the seat member is actuated, wherein the folding-over operation of the backrest and the pivot movement of the seat member are carried out independently after the operating elements have been actuated.

By folding over a backrest of the vehicle seat with a fixed seat member, the vehicle seat is arranged in a particularly compact and space-saving manner in the vehicle when not in use so that, for example, a storage space is significantly increased.

By folding over the backrest with a simultaneous or subsequent pivot movement of the seat member, access to a rear seat row in a vehicle is significantly facilitated.

The invention is particularly suitable for an individual vehicle seat, but in principle also for a bench type seat.

Embodiments of the invention are explained in greater detail below with reference to drawings, in which:

Components which mutually correspond are provided with the same reference numerals in all drawings.

Figure 1:
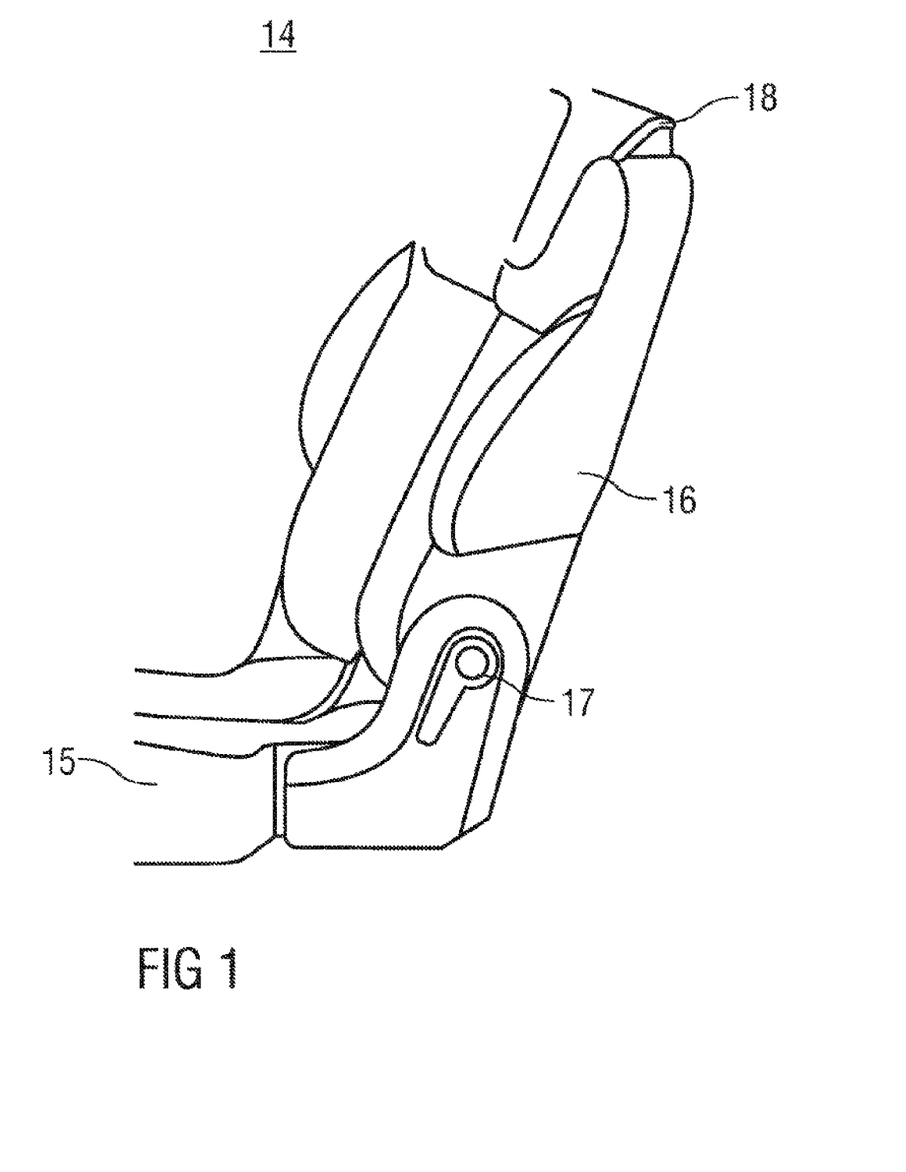
FIG. 1 is a schematic perspective view of a vehicle seat having a hinge mechanism according to the invention.

FIG. 1 is a schematic, perspective view of a vehicle seat 14 having a hinge mechanism according to the invention which is illustrated in greater detail in FIGS. 2 to 5 and which is constructed as a conventional catch fitting and which is also referred to as a catch fitting below.

The vehicle seat 14 for a motor vehicle has a seat member 15 and a backrest 16 which can be pivoted relative thereto about a main rotation axle 6.

By actuating a first operating element 17 which is arranged on the main rotation axle 6 laterally on the vehicle seat 14, the inclination of the backrest 16 relative to the seat member 15 can be adjusted between various positions for use. In this instance, the first operating element 17 is constructed as an operating lever and, for example, coupled to a transmission rod which is not illustrated in a positive and/or non-positive-locking manner. The first operating element 17 is preferably arranged at the end side on the transmission rod at the side of the vehicle seat 14, which side is directed in the direction of a vehicle door. Such a conventional transmission rod is arranged in the region of the main rotation axle 6 and couples the left-side catch fitting to the right-side catch fitting.

Furthermore, by means of corresponding operation of the first operating element 17, a so-called fold flat operation can be actuated. In such a fold flat operation, the backrest 16 is folded over flat onto the seat member 15. After the folding-over operation of the backrest 16 has been actuated by means of the first operating element 17, the folding-over operation of the backrest 16 is carried out independently, in particular in a state driven by a precompressed resilient element 26 (illustrated in FIG. 2).

By actuating a second operating element 18, a so-called fold and tumble operation of the vehicle seat 14 can be actuated separately from the fold flat operation. The term fold and tumble operation is used to refer to a folding-over operation of the backrest 16 with a simultaneous or subsequent pivot movement of the seat member 15 about a rotation axle which is arranged at the front side on the seat member 15. In this position of the vehicle seat 14, access to a rear seat row is facilitated. In this instance, the second operating element 18 is constructed as an operating lever and pivotably arranged at an upper end of the backrest 16 at the side of the vehicle seat 14, which side is directed in the direction of a vehicle door.

The seat member 15 is coupled and locked to a vehicle structure by means of at least one base hinge which is not illustrated. In order to enable the pivot movement of the seat member 15 about a rotation axle which is arranged at the front side on the seat member 15, this base hinge must be opened during the fold and tumble operation.

After the fold and tumble operation of the vehicle seat has been initiated, the folding-over operation of the backrest 16 is carried out independently, in particular in a state driven by the precompressed resilient element 26. During the folding-over movement, the base hinges are opened by means of the catch fitting which is constructed according to the invention so that subsequently the pivot movement of the seat member 15 is carried out with the folded-over backrest 16 independently, in particular in a state driven by a conventional additional precompressed resilient element which is not illustrated.

Figure 2:
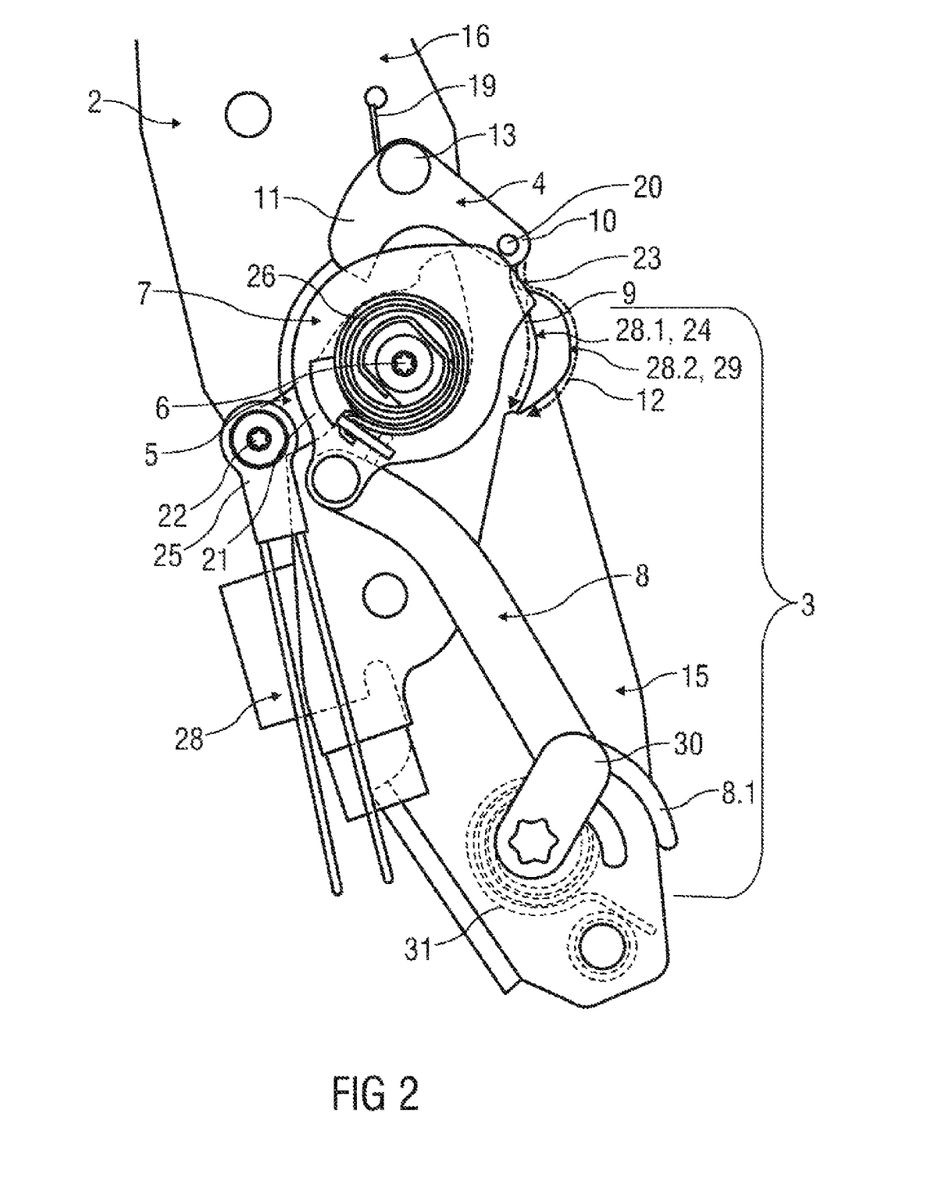
FIG. 2 is a schematic side view of a hinge mechanism according to the invention for a vehicle seat in a position for use.
Figure 3:
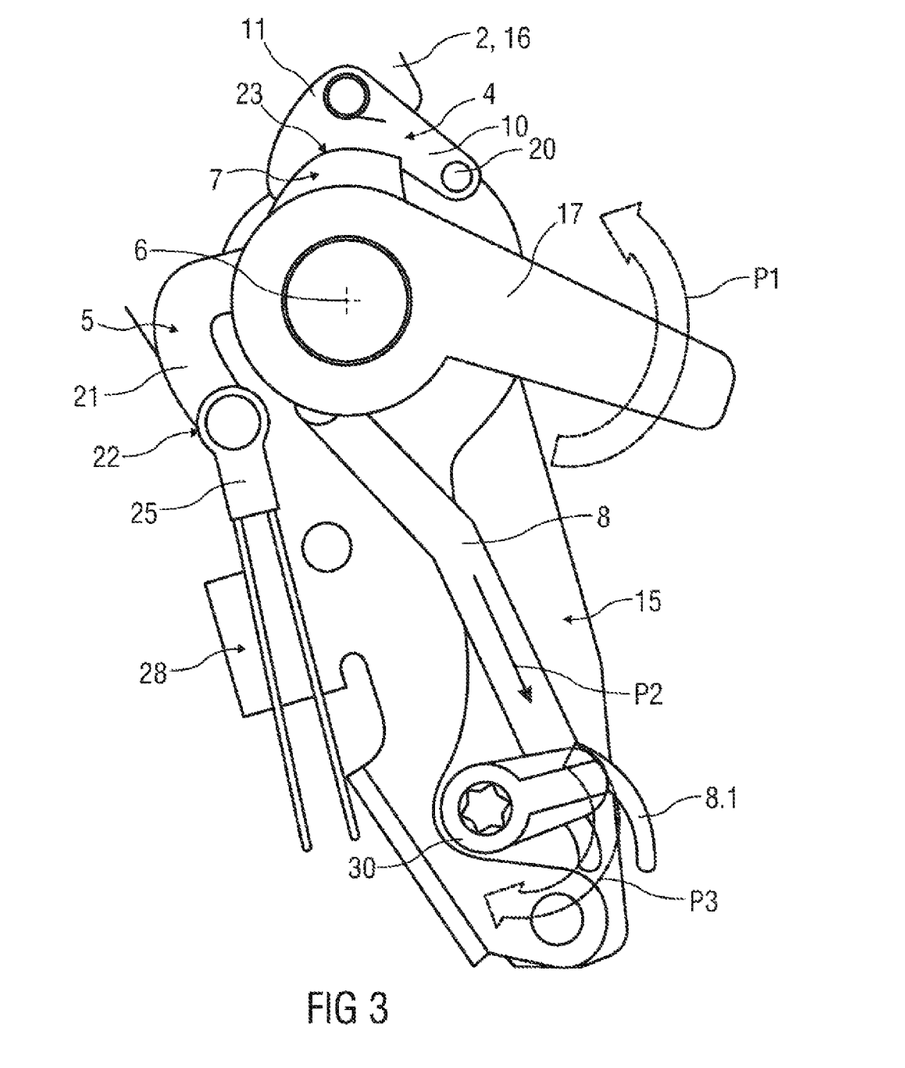
FIG. 3 is a schematic side view of a hinge mechanism according to the invention for a vehicle seat when the first operating element is actuated.
Figure 4:
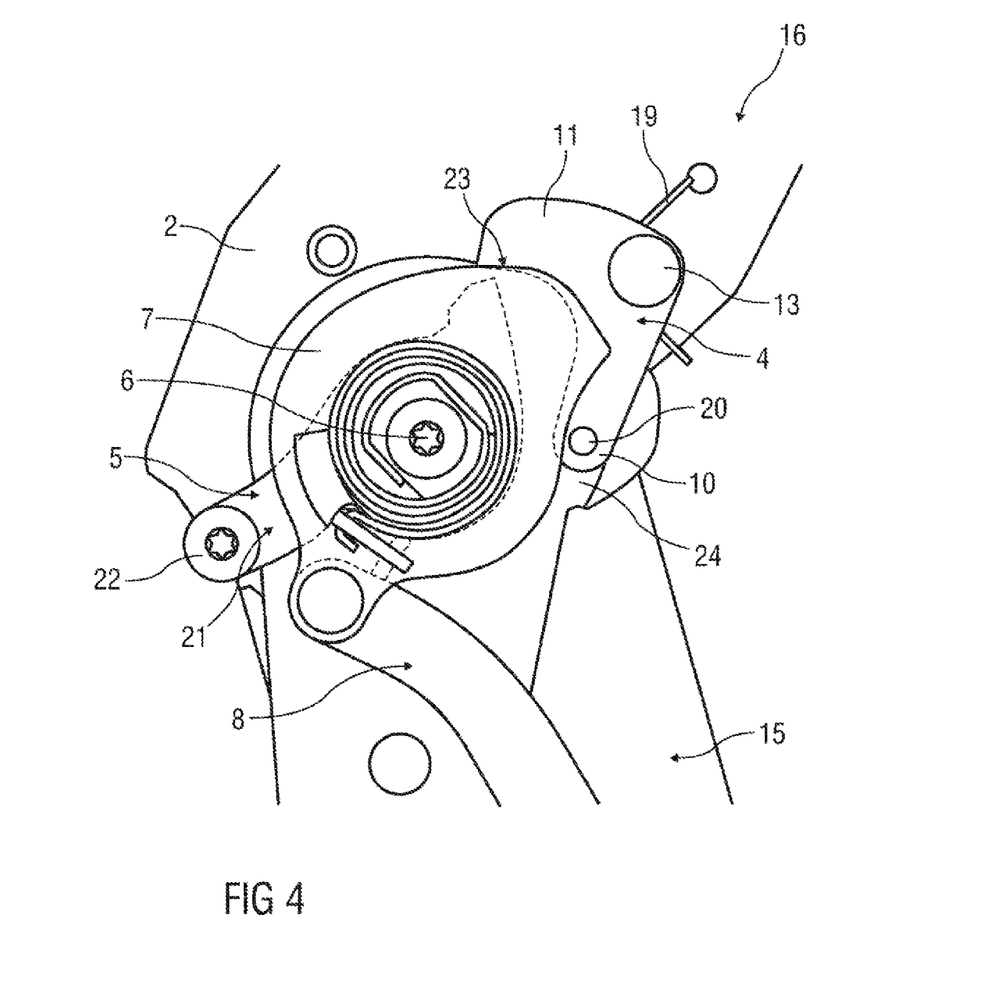
FIG. 4 is a schematic side view of a hinge mechanism according to the invention for a vehicle seat during a fold flat operation.
Figure 5:
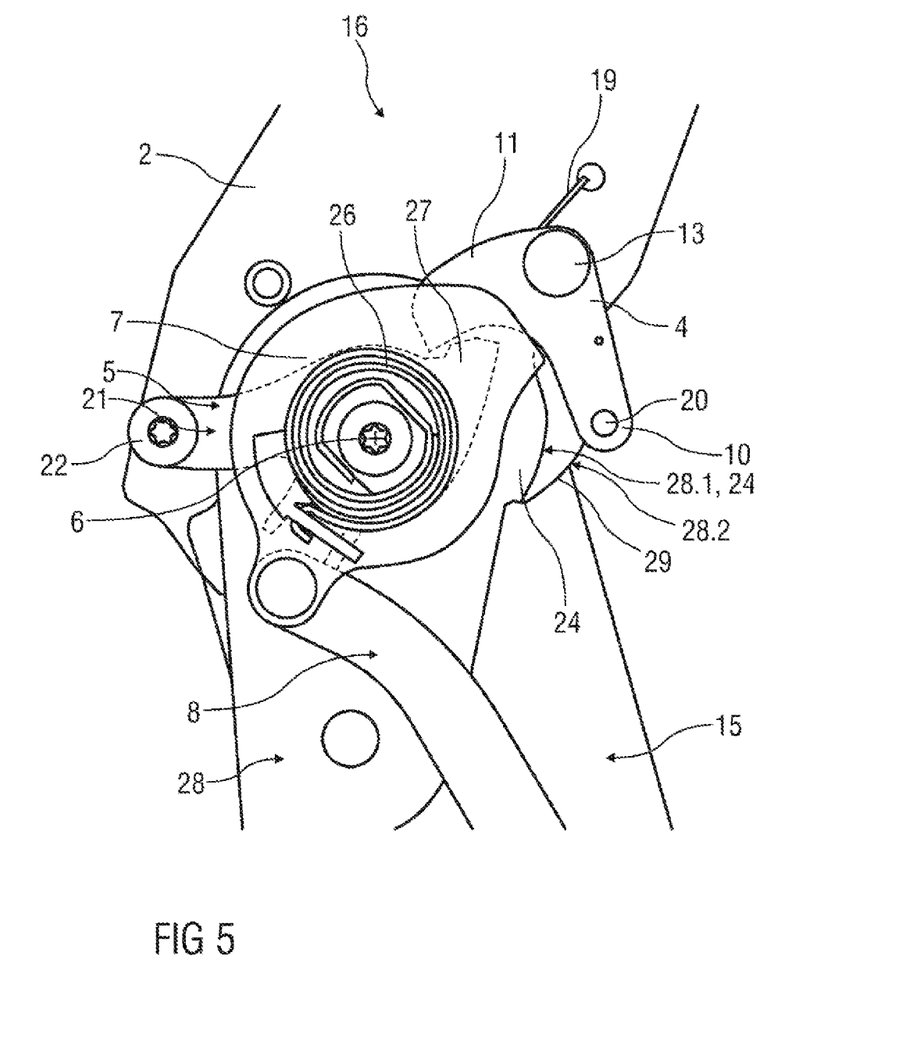
FIG. 5 is a schematic side view of a hinge mechanism according to the invention for a vehicle seat during a fold and tumble operation.

FIG. 2 is a schematic side view of a catch fitting according to the invention for the vehicle seat 14 in a position for use. The catch fitting according to FIG. 2 and the subsequent FIGS. 3 to 5 is arranged on the vehicle seat 14 opposite the catch fitting illustrated in FIG. 1. The two catch fittings which are arranged at both sides on the vehicle seat 14 are coupled to each other by means of a conventional transmission rod which is not illustrated in greater detail. The first operating element 17 is arranged only on one of the catch fittings, in particular coupled to the transmission rod at the end side. The catch fitting is arranged between the backrest 16 of the vehicle seat 14 and the seat member 15 and enables a folding-over movement of the backrest 16 relative to the seat member 15 and/or an inclination adjustment of the backrest 16 relative to the seat member 15.

The catch fitting comprises a first coupling portion 2 for connection to the backrest 16 and a second coupling portion 3 for connection to the seat member 15. In this instance, the first coupling portion 2 is conventionally arranged on a first fitting member of the catch fitting in a rotationally secure manner and pivots therewith relative to a second fitting member of the catch fitting, on which the second coupling portion 3 is arranged in a rotationally secure manner.

The catch fitting further comprises an actuation lever 4, a release lever 5, the main rotation axle 6, a redirection lever 7 and a redirection rod 8.

The actuation lever 4 is constructed in an L-shaped manner and is fixed on the backrest 16 in the central region thereof so as to be able to be pivoted about a pivot axle 13. The actuation lever 4 comprises a first lever arm 10 and a second lever arm 11 which are arranged at an angle of approximately 90 degrees+/−5° to 10° relative to each other.

The actuation lever 4 is pretensioned in a clockwise direction by means of a spring 19 which is arranged in the region of the pivot axle 13 and retained at the end side.

At the free end of the first lever arm 10, there is arranged a protruding sliding cam 20 which strikes or slides on corresponding formations and/or sliding faces of the redirection lever 7 or other components.

In the embodiment according to FIG. 2, a first actuation path 9 and a second actuation path 12 of the sliding cam 20 of the first lever arm 10 of the actuation lever 4 are illustrated by means of dashed lines. In this instance, the sliding cam 20 is guided on a plane 28.1 of a base plate 28 along the first actuation path 9 or on a boundary face 28.2 of the base plate 28 along the second actuation path 12.

The remaining components are constructed in a manner which has yet to be described in such a manner that the sliding cam 20 of the actuation lever 4, depending on the position of the redirection lever 7 during a fold flat or fold/tumble movement of the backrest 16, slides and is guided along one of two actuation paths 9, 12. The release lever 5 is rotatably supported on the main rotation axle 6 and has a coupling portion 22 at the end side of the lever-like formation 21. This coupling portion 22 is constructed as a receiving member for at least one conventional actuation pulling member 25, which is partially illustrated in FIG. 3. The actuation pulling member 25 is coupled at the other end thereof to the at least one base hinge or base lock of the vehicle seat 14.

In order to actuate a folding-over operation of the backrest 16 of the vehicle seat 14 in a fixed seat member 15, the first operating element 17 is actuated so that the backrest 16 after the folding-over operation rests flat on the seat member 15 of the vehicle seat 14. This actuation operation is schematically illustrated in FIG. 3.

The first operating element 17 is preferably arranged in a rotatable manner on the main rotation axle 6. The redirection lever 7 is coupled for entrainment to the operating element 17 in an appropriate manner and moves, as a result of the actuation of the first operating element 17 in a counter-clockwise direction, as indicated by the arrow P1. The redirection lever 7 has an actuation portion 23 for the formation of which the outer diameter of the redirection lever 7 is increased.

In the position for use of the vehicle seat 14 according to FIG. 2, the protruding sliding cam 20 of the actuation lever 4 is located on the actuation portion 23 of the redirection lever 7. Owing to the pivoting of the redirection lever 7, the actuation portion 23 pivots in the direction of the second lever arm 11 of the actuation lever 4 and moves into abutment therewith.

As a result of the pivoting of the redirection lever 7 and the actuation portion 23, the first actuation path is released. This first actuation path 9 is preferably constructed as an actuation contour 24 and, in the position for use of the vehicle seat 14 according to FIG. 2, is at least partially concealed by the actuation portion 23 of the redirection lever 7 and consequently blocked. The actuation contour 24 is in this instance formed so as to be secured to the seat member on the plane 28.1 of the base plate 28. Alternatively, the actuation contour 24 may be formed on another component in the second coupling portion 3.

In an alternative embodiment not shown in greater detail, the actuation contour 24 may instead be constructed as an actuation groove.

The redirection rod 8 which is coupled to the redirection lever 7 at the end side subsequently opens the catch fitting by the redirection rod 8 carrying out a downward movement along the arrow P2, whereby a control lever 30 which is supported at the end side in a fork 8.1 of the redirection rod 8 is pivoted downward along the arrow P3 so that a folding-over movement of the backrest 16 onto the seat member 15 is enabled.

When the backrest 16 is raised into the initial position, the control lever 30 is moved into the initial position independently, in particular in a state driven by a resilient element 31 which is compressed when the backrest 16 is folded over.

Since the first lever arm 10 of the actuation lever 4 moves along the first actuation path 9 during the folding-over movement of the backrest 16, the second lever arm 11 of the actuation lever 4 cannot come into contact with the release lever 5. Consequently, no pivot movement of the seat member 15 is actuated.

The fold and tumble operation and consequently the pivot movement of the seat member 15 is schematically illustrated in FIG. 4.

In order to actuate a folding-over operation of the backrest 16 with a simultaneous or subsequent pivot movement of the seat member 15, the second operating element 18 is actuated and opens the catch fitting directly, that is to say, not indirectly by means of the redirection rod 8 as described above. That is to say, the redirection rod 8 and the redirection lever 7 which is coupled thereto remain in an unchanged position. The actuation portion 23 of the redirection lever 7 thereby blocks the actuation contour 24 and in this manner the first actuation path 9 of the first lever arm 10 of the actuation lever 4.

Consequently, the sliding cam 20 of the first lever arm 10 of the actuation lever 4 moves during the folding-over movement of the backrest 16 along the second actuation path 12. The second actuation path 12 is preferably formed by a sliding contour 29 on the boundary face 28.2 of the base plate 28, which is formed so as to be secured to the seat member, for example, in the second coupling portion 3. The base plate 28 preferably has raised formations and consequently different planes. The actuation contour 24 and the sliding contour 29 are formed on different planes of the base plate 28 by means of correspondingly raised formations.

During the folding-over movement of the backrest 16, the second lever arm 11 of the actuation lever 4 comes into contact with a correspondingly formed carrier 27 of the release lever 5. The release lever 5 thereby rotates relative to the seat member 15 in the clockwise direction. In this instance, the formation 21 pivots with the actuation pulling members 25 which are arranged thereon in such a manner that the actuation pulling members 25 are initiated.

The release lever 5 thereby unlocks the base hinges and a compressed resilient element which is not illustrated and whose resilient force acts on the seat member 15 and pivots it.

This operation is illustrated schematically in FIG. 5.

LIST OR REFERENCE NUMERALS

2 First coupling portion
3 Second coupling portion
4 Actuation lever
5 Release lever
6 Main rotation axle
7 Redirection lever
8 Redirection rod
8.1 Fork
9 First actuation path
10 First lever arm
11 Second lever arm
12 Second actuation path
13 Pivot axle 14 Vehicle seat
15 Seat member
16 Backrest
17 First operating element
18 Second operating element
19 Spring
20 Sliding cam
21 Lever-like formation
22 Coupling portion
23 Actuation portion
24 Actuation contour
25 Actuation pulling member
26 Resilient element
27 Carrier
28 Base plate
28.1 Plane
28.2 Boundary face
29 Sliding contour
30 Control lever
31 Resilient element
P1 to P3 Arrows

The invention claimed is:

1. A vehicle seat, comprising:
a hinge mechanism that includes:
an actuation lever and
a release lever;
a redirection lever and a redirection rod which is connected thereto at an end side;
a first operating element for a folding-over operation of a backrest in the direction toward a seat member when the seat member is in a fixed position; and
a separate second operating element for folding over the backrest and pivoting the seat member,
wherein,
in the event of actuation of the first operating element, the redirection lever is able to be coupled to the first operating element for entrainment in such a manner that the redirecting rod opens the hinge mechanism or, when the second operating element is actuated, the element opens the hinge mechanism, and the actuation lever is coupleable to the release lever for entrainment in such a manner that the vehicle seat is unlockable at a floor side.

2. The vehicle seat as claimed in claim 1, wherein the actuation lever is constructed in an L-shaped manner and comprises a first lever arm and a second lever arm which are arranged at an angle of 90 degrees relative to each other.

3. The vehicle seat as claimed in claim 1, wherein the actuation lever is fixed on the backrest of the vehicle seat in a central region thereof so as to be able to be pivoted about a pivot axle.

4. The vehicle seat as claimed in claim 2, wherein a protruding sliding cam is arranged at a free end of the first lever arm.

5. The vehicle seat as claimed in claim 3, wherein the actuation lever is pretensioned by a spring which is arranged in the region of the pivot axle.

6. The vehicle seat as claimed in claim 4, wherein the sliding cam of the first lever arm of the actuation lever is movable along a first actuation path or a second actuation path.

7. The vehicle seat as claimed in claim 6, wherein the first actuation path is constructed as an actuation contour and a movement of the first lever arm of the actuation lever along the first actuation path brings about the folding-over operation of the backrest of the vehicle seat with the seat member fixed.

8. The vehicle seat as claimed in claim 6, wherein the second actuation path is constructed as a sliding contour and a movement of the first lever arm of the actuation lever along the second actuation path brings about the folding-over operation of the backrest with the simultaneous or subsequent pivot movement of the seat member.

9. The vehicle seat as claimed in claim 6, wherein the first actuation path is blockable as a function of the position of the redirection lever.

* * * * *

UNITED STATES PATENT AND TRADEMARK OFFICE
CERTIFICATE OF CORRECTION

| | |
|---|---|
| PATENT NO. | : 9,440,558 B2 |
| APPLICATION NO. | : 14/407420 |
| DATED | : September 13, 2016 |
| INVENTOR(S) | : James Abraham and Robin Advena |

It is certified that error appears in the above-identified patent and that said Letters Patent is hereby corrected as shown below:

On the title page

Page 2, item (56) (References cited – Foreign Patent Documents), first cited reference DE 1020060 17 7 A1 should read as follows:

--DE 1020060 17 797 A1--

Signed and Sealed this
Thirteenth Day of December, 2016

Michelle K. Lee
*Director of the United States Patent and Trademark Office*